United States Patent [19]

Corghi

[11] Patent Number: 4,882,932
[45] Date of Patent: Nov. 28, 1989

[54] LIFT WITH TRANSDUCER FOR BALANCING TIRES ON A VEHICLE

[76] Inventor: Remo Corghi, 1, Piazza Carducci - I 42015, Correggio Emilia (Reggio Emilia), Italy

[21] Appl. No.: 274,684

[22] Filed: Nov. 22, 1988

Related U.S. Application Data

[63] Continuation of Ser. No. 196,769, May 18, 1988, abandoned, which is a continuation of Ser. No. 860,875, May 8, 1986, abandoned.

[51] Int. Cl.$^4$ .................... G01M 1/28; B66F 5/00
[52] U.S. Cl. .................... 73/457; 254/93 H; 254/122
[58] Field of Search ............... 73/457; 254/93 H, 122

[56] References Cited

U.S. PATENT DOCUMENTS

| | | | |
|---|---|---|---|
| 2,567,681 | 9/1951 | Schwartz et al. | 254/93 H |
| 3,483,756 | 12/1969 | Merrill | 73/457 |
| 3,754,447 | 8/1973 | Turton-Smith et al. | 73/457 |
| 3,892,132 | 7/1975 | Coton | 73/457 |
| 3,903,746 | 9/1975 | Goebel | 73/457 |

Primary Examiner—John Chapman
Attorney, Agent, or Firm—Birch, Stewart, Kolasch & Birch

[57] ABSTRACT

A lifting unit with an incorporated piezoelectric transducer comprises an extendable trolley (1–4) with a frontwardly tapered plan profile and is upperly provided with a flat vertical compass structure (5) which is symmetrically disposed about the main axes of the underlying trolley (1–4) and has its arms converging towards a horizontal box member (6) containing a piezoelectric transducer (15), at which the arms are linked together and at which there is provided, above the box member (6), a positionable lifting and support saddle (21) which is disposed transversely to the flat vertical compass structure (5).

13 Claims, 3 Drawing Sheets

LIFT WITH TRANSDUCER FOR BALANCING TIRES ON A VEHICLE

This is a continuation of application Ser. No. 196,769, filed May 18, 1988, and now abandoned which is a continuation of application Ser. No. 860,875 filed May 8, 1986 and abandoned.

In balancing tires, increasing use is currently made of the method by which balancing is carried out directly on the motor vehicle, without the wheels having to be removed.

The procedure for this known wheel balancing method is as follows: the motor vehicle is raised by a normal lifting device at the end at which the balancing operation is to be carried out, then a robust column with a piezoelectric transducer at its top is placed under the suspension of the wheel concerned, after which the vehicle is lowered so that said suspension rests on the column, and finally the tire is rotated by a suitable propelling wheel provided on a mobile apparatus separate from the the vehicle.

In the normal manner, the piezoelectric transducer senses any wheel vibration in the vertical plane, and feeds suitable signals to an apparatus which processes them in order to indicate the weight, the angular position and the choice of inner or outer arrangement of the counterweight which has to be applied to the rim in order to balance the corresponding wheel.

This procedure suffers from certain drawbacks, deriving from the fact that as the three aforesaid devices have necessarily to be used, the operator concerned with the balancing is compelled to move several times from one device to another and has to carry out various operations on one and the same device, thus resulting in inconvenient time loss.

Various attempts have been made to obviate the aforesaid by associating a normal piezoelectric transducer with the support plate of the lifting devices normally used in this sector, however such combinations have not led to the required results. This is because said plate is fitted to a projecting arm, this arm thus being insufficiently rigid for such applications in that it vibrates together with the suspension, the output data from the transducer thus being incorrect with the result that the balancing counterweight to be fitted to the rim in the stated manner is inaccurately determined.

The present patent provides and protects a unit able to obviate the aforesaid within the framework of a simple and rational construction.

According to the invention, the construction used for this purpose comprises a flat vertical structure of variable profile, which is symmetrically disposed about the transverse and longitudinal axes of symmetry of an extendable support trolley, and is provided at its top with a piezoelectric transducer with which a positionable saddle is associated for lifting a motor vehicle. More particularly, the extendable trolley comprises two axles provided with wheels and having their central zones connected together by a hydraulic cylinder-piston unit, there being connected to said axles in correspondence with said central zones two identical bars which converge towards a hollow block where they comprise mutually engaged toothed sectors. The two bars are hinged to said hollow block, which is in the form of a parallelepiped box member with its mouth facing upwards, and the toothed sectors advantageously enable the box member to always remain perfectly horizontal and aligned vertically with the centre of the underlying trolley, and allow the two bars to open and close in the manner of a compass.

Essentially, if the invention is viewed from one side, the the two bars form together with the trolley an isosceles triangle structure, the vertex angle of which varies in magnitude according to the degree of extension of the hydraulic cylinder-piston unit.

The box member houses, in a conveniently fixed manner, a piezoelectric transducer against which the positionable saddle rests by way of a central ball, and has one end removably coupled to one side wall of the box member whereas at its other end it extends towards the opposite side wall of the box member where it comprises a ledge for supporting/raising a motor vehicle. As stated the saddle is positionable, in the sense that further hooking means are also provided on the opposite side wall of the box member to enable the saddle to be rotated through 180 degrees from its previous position, so as to enable the invention to be able to operate on two opposing wheels, or on one and the same wheel but acting from two opposing directions.

It should be noted that the triangular configuration makes the invention extremely robust and rigid whatever the degree of divergence of the two bars, which act as struts, and the consistency of the assembly is ensured by the hydraulic cylinder-piston unit, which by using an incompressible fluid acts as a connection member possessing the required strength and/or rigidity.

Because of the aforesaid elements, when the invention is in its rest position its overall height is very small, thus considerably facilitating its insertion under a motor vehicle, this being also aided by the presence of a suitable operating handle and the particular plan configuration of the trolley, as is described in detail hereinafter. It should also be noted that the compass structure has a very small depth, which enables that part of the saddle projecting beyond the point of contact with the transducer to be kept to minimum dimensions, so as to ensure that only vibrations occurring in a vertical plane are picked up.

All the objects of the invention are therefore attained, in that the operations involved in balancing a wheel are greatly accelerated, with considerable time saving, due to the fact that the balancing can be completely carried out by using only the unit according to the invention and a normal apparatus for rotating the wheel to be balanced and for processing the output signals from the piezoelectric transducer. In this respect, it is necessary only to place the invention below the suspension of the wheel to be balanced, and then raise the saddle in order to lift the vehicle, after which the actual balancing is ready to be carried out.

The characteristics and constructional merits of the invention will be more apparent from the detailed description given hereinafter with reference to the accompanying figures, in which.

Figure 1:
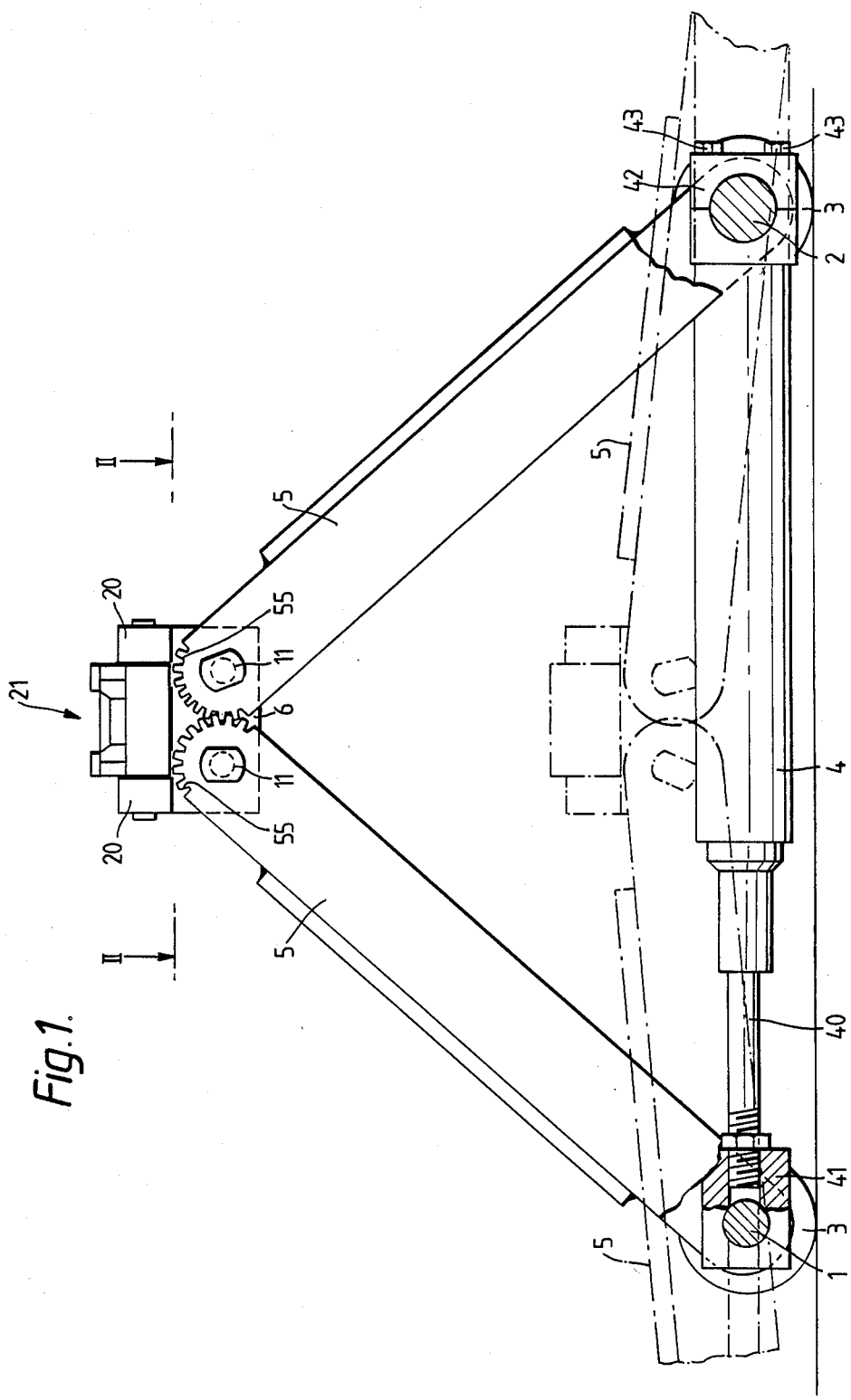
FIG. 1 is a partly sectional side view of the invention in two operating positions, namely a partially raised position (full lines) and a completely lowered position (dashed and dotted lines)

From said figures it can be seen that the invention comprises a trolley provided with a front axle 1 and a rear axle 2 which are fitted with respective idle end wheels 3. These axles are of different lengths (see FIG.

2). The two axles 1, 2 are connected together at their centre by a coplanar hydraulic cylinder-piston unit 4 (FIG. 1) provided with suitable inlet/outlet pipes (not shown) for the operating fluid, and usual means for the forced feeding of this latter. The rod 40 of the unit 4 is fixed to a block 41 which is rotatably mounted on the front axle 1, and the endpiece 42 of said unit 4 is formed in two parts which are clamped together by suitable screws 43 (FIG. 2), and is rotatably mounted on a reduced diameter central portion of the rear axle 2.

By using two axles 1, 2 of different lengths, the trolley is given a forwardly tapering shape which can be inscribed in an isosceles triangle, and facilitates its movement/insertion under a motor vehicle.

A first channel-shaped bar 5 with its opening facing downwards has its lateral walls hinged to the sides of said block 41, and extends upwards towards the central zone of the trolley where the said two lateral walls embrace the corresponding end portion of a box member 6. This latter is in the shape of a right angled parallelepiped, and its other end portion is embraced by the projecting ends of the lateral walls of a second channel-shaped bar 5, which extends downwards to be fixed to the rear axle 2. As this latter is longer than the front axle 1, two opposing stiffening plates 7 are welded to its inner generators, and are also welded to the sides of said second bar 5.

A ledge 8 is fixed to the outer generators of said rear axle 2, and is centrally provided with two salient rack-shaped plates 9, on which a suitable operating handle 10 is pivotally mounted (FIG. 2), and can be locked in the required operating position by a suitable latch member which engages with the coupling recesses of said two rack-shaped plates 9. Said ledge 8 can also be used as the support base for the said means for the forced feeding of the hydraulic oil to the cylinder-piston unit 4.

Figure 2:
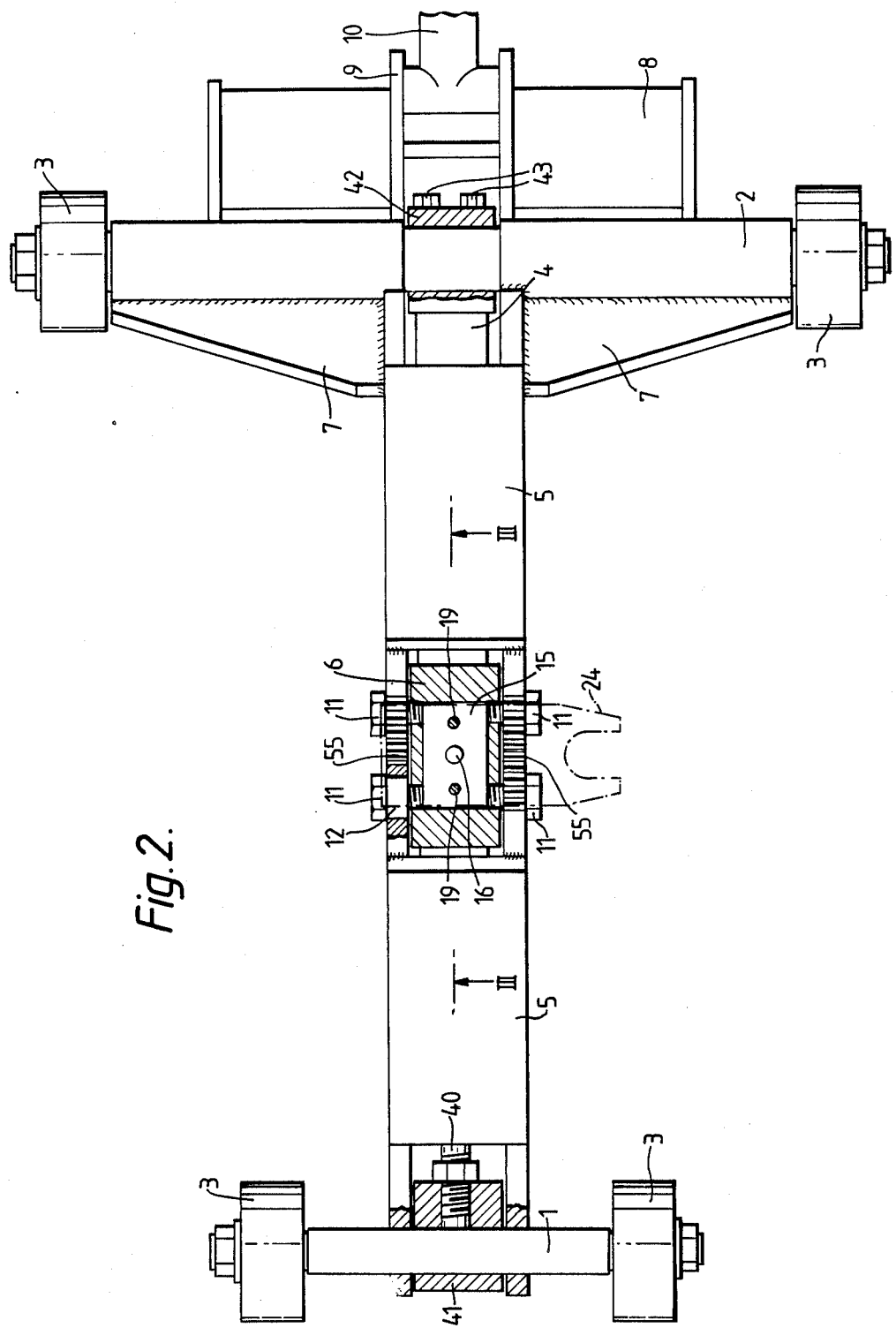
FIG. 2 is a section on the line II—II of FIG. 1.
Figure 4:
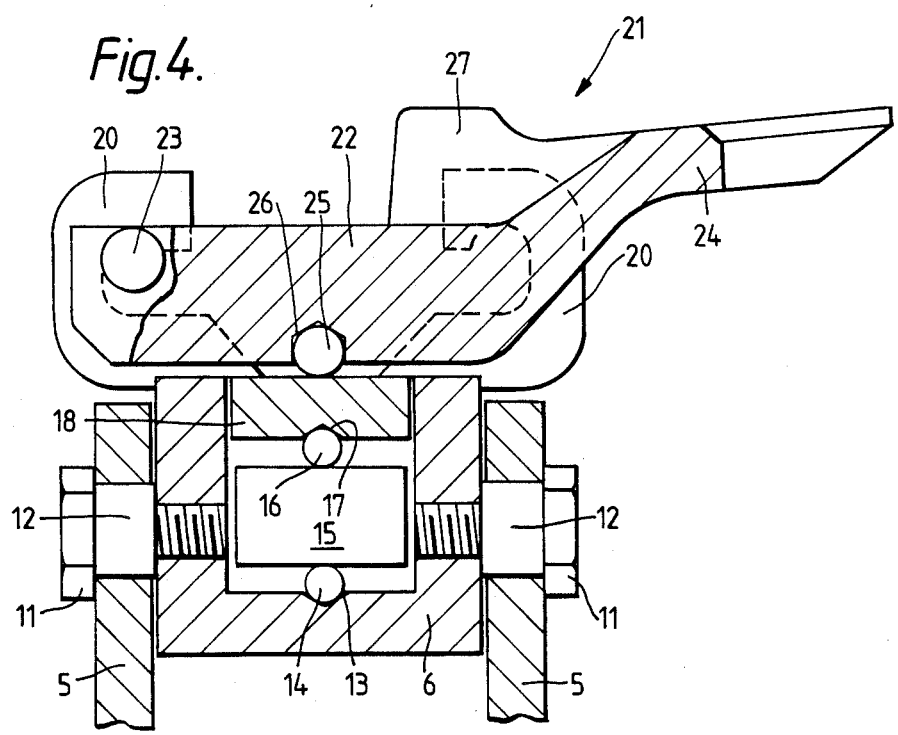
FIG. 4 is a section on the line IV—IV of FIG. 3.

As is clearly shown in FIGS. 2 and 4, each lateral wall of each bar 5 is hinged to said box member 6 by a screw 11 having a terminal threaded shank which is screwed into the corresponding lateral wall of the box member 6, and comprising at the head end an enlarged unthreaded portion 12 acting as the hinge pin for the respective bar 5.

Moreover, in order to ensure that the two bars 5 undergo equivalent movements both during opening and during closure, and to ensure that the box member 6 always assumes a horizontal position whatever its level, the upper end of each lateral wall of each bar 5 is provided with a toothed sector 55 which constantly engages with an identical toothed sector 55 provided at the upper end of the other bar 5 (FIG. 1).

Figure 3:
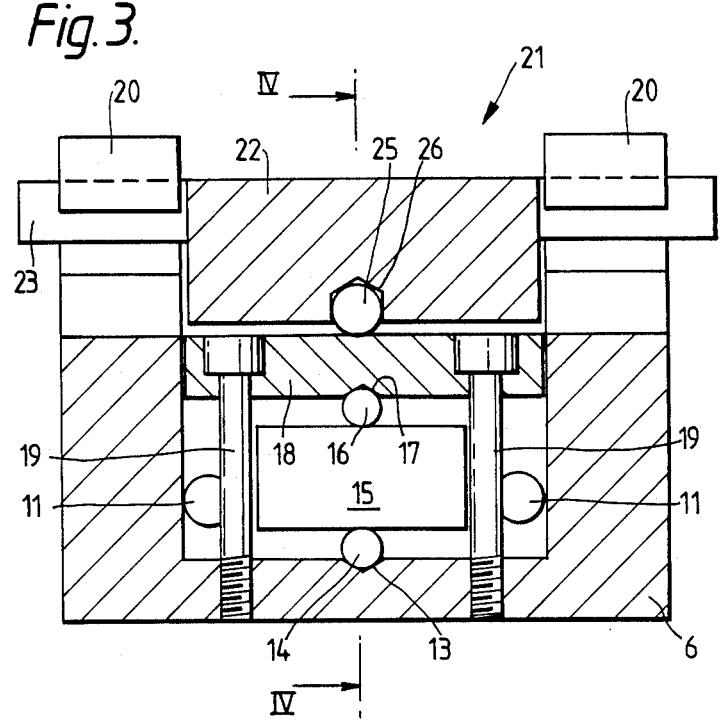
FIG. 3 is a section on the line III—III of FIG. 2.

From FIGS. 3 and 4 it can be seen that the base of the box member 6 is provided centrally with a small conical recess 13 which partly houses a ball 14, on which a normal piezoelectric transducer 15 rests. This latter is contacted centrally by an overlying ball 16 partly housed in a conical recess 17 provided in the lower face of a pressure plate 18 which closes the mouth of the box member 6. The upper face of said plate 18 is coplanar with said mouth, and said plate 18 is clamped against the transducer 15 by two orthogonal screws 19 which are screwed into the base of the box member 6, their purpose also being to keep the transducer 15 centered about the longitudinal axis of the box member 6 (FIG. 3).

Again with reference to FIGS. 3 and 4, at the opposing ends of each lateral wall of the box member 6 there are provided two salient hooks 20 having their curved ends facing the central zone of the box member 6, to act as coupling and retention seats for a saddle 21 which, as stated initially, is to be rested under the suspension of a wheel of a motor vehicle in order to raise this latter. Said saddle 21 comprises a robust baseplate 22 to be inserted between the two opposing pairs of hooks 20 (FIG. 3) and provided at one end with a pin 23 with projecting ends to be hooked by one of said two pairs of hooks 20, and at the other end with a fork or arm 24 which is inclined to the horizontal and projects beyond the other pair of hooks 20 (FIG. 4). The plate 22 is located a short distance from, and parallel to, the mouth of the box member 6, said plate 22 being supported by the pressure plate 18 by way of a ball 25 partly housed in a conicalbased cylindrical recess 26 provided in the lower face of the plate 22. It should be noted that the centres of the three balls 25, 16 and 14 lie on the same vertical straight line, which coincides with the vertical axis of the box member 6, itself corresponding to the line along which said box member is raised/lowered.

Finally, transversely on the fork 24 which is inclined to the horizontal there are provided two opposing profiled raised portions 27 (see FIG. 4) which, together with the free ends of the arms of said fork 24, define a horizontal plane situated at a higher level than that defined by the four hooks 20. To reverse the saddle 21, it is only necessary to swing the fork 24 upwardly about pin 23 until the fork clears the opposed hook, and then move the saddle laterally toward the center of the block to withdraw pin 23 from the hook 20. The saddle can then lifted upwardly and turned 180 degrees so the fork extends in the opposite direction. The pin 23 is then positioned under the opposite hooks, and the fork is pivoted downwardly to a position which is the mirror image of that shown in FIG. 4.

The advantages and the use of the invention are apparent from the aforegoing and from a simple examination of the accompanying figures.

Referring to FIG. 1, it should be noted that when the two bars 5 are in their completely lowered position, they do not lie perfectly horizontal and coplanar but converge slightly upwards in order to prevent dangerous jamming.

I claim:

1. Wheel balancing apparatus comprising, a lifting unit and a piezoelectric transducer, said lifting unit comprising a trolley having a first arm and a second arm, each arm having an upper end and a lower end, means pivotally connecting said lower ends of said arms to supports spaced from each other for movement of said lower ends toward and away from each other, means pivotally connecting said upper ends of said arms to a horizontal housing containing said piezoelectric transducer, said arms converging toward each other from said lower ends toward said housing, means interconnecting said arms for simultaneous movement of said lower ends of said arms toward and away from each other, a lifting and support saddle above said housing, said support saddle extending transversely of said arms, means for driving said lower ends of said arms toward each other to lift said housing, and means supporting said saddle on said transducer so that vibrations from a wheel supported by said saddle are transmitted to said transducer.

2. Wheel balancing apparatus according to claim 1 wherein said supports for said lower ends of said arms comprise, a front axle of said trolley and a rear axle of said trolley, and idle wheels mounted for rotation on each of said axles, and wherein, said means for driving said lower ends of said arms toward each other comprises a pulling unit connected to and extending between said axles.

3. Wheel balancing apparatus according to claim 2 wherein one of said axles of said trolley is shorter than the other so that said trolley has a tapered plan profile.

4. Wheel balancing apparatus according to claim 2 wherein, said pulling unit connected to and extending between said axles comprises an hydraulic cylinder-piston unit.

5. Wheel balancing apparatus according to claim 4 wherein said housing comprises a parallelepiped housing, said arms comprise two substantially identical arms with fork like upper and lower ends, said lower ends embrace corresponding ends of the hydraulic cylinder-piston unit, and said upper ends embrace opposite portions of said housing and are pivotally connected to said housing with journal pins.

6. Wheel balancing apparatus according to claim 1 wherein said means interconnecting said arms for simultaneous movement of said lower ends of said arms toward and away from each other comprises gear means on said upper ends of said arms in mesh with each other for interconnecting said arms for simultaneous movement of said lower ends toward and away from each other.

7. Wheel balancing apparatus according to claim 6 wherein said gear means comprise toothed sectors at the upper ends of each of the arms, said sectors meshing with each other to maintain the arms generally vertically symmetrical.

8. Wheel balancing apparatus according to claim 2 further comprising, an operating handle for actuating said pulling unit for moving said lower ends of said arms toward and away from each other.

9. Wheel balancing apparatus according to claim 7 wherein, said toothed sectors at the upper ends of each of the arms each comprise gear teeth formed in the upper end of each of said arms.

10. Wheel balancing apparatus according to claim 2 wherein, said pulling unit comprises an hydraulic cylinder-piston unit.

11. Wheel balancing apparatus according to claim 1 wherein, said lifting and support saddle comprises a support arm projecting transversely of and offset to one side of said housing, said housing further comprises first hook means offset transversely to one side of the housing and second hook means offset transversely to the other side of the housing, means on said lifting and support saddle for releasably engaging in either of said hook means so that said saddle can be connected to said housing with said arm of said saddle extending in either direction transversely of said housing, and cooperating means on said saddle and said housing for transmitting vibrations from said arm to said housing.

12. Wheel balancing apparatus according to claim 1 wherein, said lifting and support saddle comprises a support arm projecting transversely of and offset to one side of said housing, said housing further comprises a first pair of spaced apart hooks offset transversely to one side of the housing and second pair of spaced apart hooks offset transversely to the other side of the housing, pin means at one end of said lifting and support saddle for releasably engaging in either of said pairs of hooks so that said saddle can be connected to said housing with said arm of said saddle extending between the respective pairs of hooks in either direction transversely of said housing.

13. Wheel balancing apparatus according to claim 12 further comprising bearing means between said saddle and said housing for transmitting vibrations from said arm to said housing, said bearing means comprising a ball extending between and engaging an upper surface of said housing and a lower surface of said saddle.

* * * * *